United States Patent
Brandwine et al.

(10) Patent No.: US 9,729,517 B2
(45) Date of Patent: Aug. 8, 2017

(54) SECURE VIRTUAL MACHINE MIGRATION

(71) Applicant: Amazon Technologies, Inc., Reno, NV (US)

(72) Inventors: Eric Jason Brandwine, Haymarket, VA (US); Matthew Shawn Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 95 days.

(21) Appl. No.: 13/746,702

(22) Filed: Jan. 22, 2013

(65) Prior Publication Data

US 2014/0208111 A1 Jul. 24, 2014

(51) Int. Cl.
| | |
|---|---|
| H04L 29/06 | (2006.01) |
| H04L 9/08 | (2006.01) |
| G06F 3/06 | (2006.01) |
| G06F 9/48 | (2006.01) |
| G06F 21/57 | (2013.01) |
| G06F 9/455 | (2006.01) |

(52) U.S. Cl.
CPC ........ *H04L 63/0428* (2013.01); *G06F 3/0647* (2013.01); *G06F 9/45558* (2013.01); *G06F 9/4856* (2013.01); *G06F 21/57* (2013.01); *H04L 9/0844* (2013.01); *H04L 63/0869* (2013.01); *G06F 2009/4557* (2013.01); *G06F 2009/45562* (2013.01); *G06F 2009/45587* (2013.01)

(58) Field of Classification Search
CPC .................................................... G06F 3/0647
USPC ........................................................ 713/171
See application file for complete search history.

(56) References Cited

U.S. PATENT DOCUMENTS

| | | | | |
|---|---|---|---|---|
| 5,638,541 | A | * | 6/1997 | Sadashivaiah ........ G06F 1/3215 710/306 |
| 5,805,910 | A | * | 9/1998 | Lee ....................... G06F 1/3215 307/66 |
| 6,704,871 | B1 | | 3/2004 | Kaplan et al. |
| 6,826,690 | B1 | | 11/2004 | Hind |

(Continued)

FOREIGN PATENT DOCUMENTS

| | | |
|---|---|---|
| JP | 2003-006306 | 1/2003 |
| JP | 2003-051838 | 2/2003 |

(Continued)

OTHER PUBLICATIONS

SG Written Opinion dated Oct. 10, 2015 issued in Application No. 11201505652U.

(Continued)

*Primary Examiner* — Harris C Wang
(74) *Attorney, Agent, or Firm* — Hogan Lovells US LLP

(57) ABSTRACT

A formalized set of interfaces (e.g., application programming interfaces (APIs)) is described, that uses a security scheme, such as asymmetric (or symmetric) cryptography, in order to enable secure migration of virtual machine instances between multiple host computing devices. The migration is performed by receiving a request to migrate a virtual machine where the request includes public keys for the source host computing and the destination host computing. The source and destination hosts use the public keys to establish an encrypted session and then use the encrypted session to migrate the virtual machine.

20 Claims, 10 Drawing Sheets

(56) References Cited

U.S. PATENT DOCUMENTS

| | | | |
|---|---|---|---|
| 6,826,715 B1* | 11/2004 | Meyer | G06F 11/2289 713/1 |
| 7,020,880 B2* | 3/2006 | Mellen-Garnett | G06F 9/54 718/101 |
| 7,272,832 B2 | 9/2007 | Gardner | |
| 8,336,079 B2 | 12/2012 | Budko et al. | |
| 8,738,932 B2 | 5/2014 | Lee et al. | |
| 8,800,050 B2 | 8/2014 | Ray | |
| 2002/0018569 A1* | 2/2002 | Panjwani | H04L 63/061 380/247 |
| 2002/0196946 A1 | 12/2002 | Challener | |
| 2003/0074570 A1* | 4/2003 | Miyoshi | H04L 29/12254 713/190 |
| 2003/0101322 A1 | 5/2003 | Gardner | |
| 2004/0064691 A1 | 4/2004 | Lu | |
| 2006/0133604 A1 | 6/2006 | Buer et al. | |
| 2006/0256106 A1 | 11/2006 | Scarlata | |
| 2008/0282348 A1 | 11/2008 | Proudler et al. | |
| 2009/0106551 A1* | 4/2009 | Boren | H04L 9/0822 713/158 |
| 2009/0119763 A1* | 5/2009 | Park | H04L 63/0815 726/8 |
| 2009/0154709 A1* | 6/2009 | Ellison | 380/282 |
| 2009/0169012 A1* | 7/2009 | Smith | G06F 21/57 380/277 |
| 2009/0172038 A1* | 7/2009 | Mintchev | G06Q 30/06 |
| 2009/0178123 A1 | 7/2009 | Carpenter et al. | |
| 2009/0276771 A1* | 11/2009 | Nickolov et al. | 717/177 |
| 2009/0293057 A1 | 11/2009 | Larkin et al. | |
| 2010/0023755 A1* | 1/2010 | Kotani | G06F 21/33 713/156 |
| 2010/0030982 A1* | 2/2010 | Sela | G06F 21/10 711/162 |
| 2010/0071025 A1* | 3/2010 | Devine | G06F 9/45558 726/1 |
| 2010/0169948 A1 | 7/2010 | Budko | |
| 2010/0257602 A1 | 10/2010 | Kettler et al. | |
| 2010/0281273 A1 | 11/2010 | Lee | |
| 2010/0332635 A1 | 12/2010 | Rogel | |
| 2010/0332820 A1* | 12/2010 | Matsushima | G06F 21/10 713/150 |
| 2011/0066597 A1 | 3/2011 | Mashtizadeh et al. | |
| 2011/0088032 A1 | 4/2011 | Garrett et al. | |
| 2011/0153697 A1 | 6/2011 | Nickolov et al. | |
| 2011/0202917 A1 | 8/2011 | Laor | |
| 2011/0208908 A1 | 8/2011 | Chou et al. | |
| 2012/0054367 A1* | 3/2012 | Ramakrishnan et al. | 709/242 |
| 2012/0117625 A1 | 5/2012 | Ray | |
| 2012/0204020 A1* | 8/2012 | Novak et al. | 713/2 |
| 2012/0324446 A1 | 12/2012 | Fries et al. | |
| 2013/0013921 A1 | 1/2013 | Bhathena et al. | |
| 2013/0073856 A1 | 3/2013 | Sherkin et al. | |
| 2013/0151848 A1* | 6/2013 | Baumann et al. | 713/164 |
| 2013/0290711 A1 | 10/2013 | Rajkumar et al. | |
| 2014/0040997 A1 | 2/2014 | Anantharaju | |
| 2014/0208096 A1 | 7/2014 | Brandwine et al. | |
| 2014/0208097 A1 | 7/2014 | Brandwine et al. | |

FOREIGN PATENT DOCUMENTS

| | | |
|---|---|---|
| JP | 2005-529392 | 9/2005 |
| JP | 2007-122303 | 5/2007 |
| JP | 2007-214767 | 8/2007 |
| JP | 2008-535049 | 8/2008 |
| JP | 2011-035573 | 4/2011 |
| JP | 2011-194921 | 10/2011 |
| JP | 2012-194710 | 10/2012 |
| JP | 2012-531679 | 12/2012 |
| KR | 10-1701664 | 1/2017 |
| KR | 10-1704329 | 2/2017 |
| SG | 11201505652 U | 5/2016 |
| SG | 11201505651 W | 6/2016 |
| SG | 11201505654 Y | 9/2016 |
| WO | 2009-155574 | 12/2009 |

OTHER PUBLICATIONS

PCT International Search Report and Written Opinion dated Jun. 16, 2014 for International Application No. PCT/US 14/12605.

PCT International Search Report and Written Opinion dated Jun. 13, 2014 for International Application No. PCT/US 14/12604.

PCT International Preliminary Report on Patentability dated Jul. 28, 2015 for International Application No. PCT/US 14/12606.

PCT International Preliminary Report on Patentability dated Jul. 28, 2015 for International Application No. PCT/US 14/12604.

PCT International Preliminary Report on Patentability dated Jul. 28, 2015 for International Application No. PCT/US 14/12605.

US Non-Final Office Action dated Apr. 27, 2015 issued in U.S. Appl. No. 13/746,780.

US Non-Final Office Action dated May 21, 2015 issued in U.S. Appl. No. 13/746,737.

International Search Report and Written Opinion of the International Searching Authority for International Application No. PCT/US14/12606, date of mailing Jun. 16, 2014.

US Final Office Action dated Jan. 20, 2016 issued in U.S. Appl. No. 13/746,737.

US Non-Final Office Action dated Jun. 16, 2016 issued in U.S. Appl. No. 13/746,737.

US Notice of Allowance dated May 26, 2016 issued in U.S. Appl. No. 13/746,780.

Australian Office Action dated Apr. 6, 2016 issued in application serial No. 201409471.

Australian Office Action dated Apr. 13, 2016 issued in application serial No. 2014290472.

U.S. Final Office Action dated Dec. 1, 2016 issued in U.S. Appl. No. 13/746,737.

Australian Office Action dated Sep. 2, 2016 issued in Application Serial No. 2014209470.

Australian Office Action dated Oct. 26, 2016 issued in Application Serial No. 2014209471.

Canadian Office Action dated Jun. 29, 2016 issued in Application Serial No. 2,898,908.

Canadian Office Action dated Aug. 8, 2016 issued in Application Serial No. 2,898,906.

Canadian Office Action dated Sep. 14, 2016 issued in Application Serial No. 2,898,907.

Chinese Notice of Publication dated Nov. 11, 2015 issued in Application Serial No. 201480010597.6.

Chinese Notice of Publication dated Oct. 21, 2015 issued in Application Serial No. 201480005603.9.

Chinese Notice of Publication dated Nov. 11, 2015 issued in Application Serial No. 201480007923.8.

EP Notice of Publication dated Nov. 4, 2015 issue in Application Serial No. 14743308.0.

EP EESR dated Aug. 26, 2016 issued in Application Serial No. 14743308.0.

EP Notice of Publication dated Nov. 4, 2015 issue in Application Serial No. 14743515.0.

EP EESR dated Aug. 29, 2016 issued in Application Serial No. 14743515.0.

EP Notice of Publication dated Nov. 4, 2015 issue in Application Serial No. 14743678.6.

EP EESR dated Aug. 16, 2016 issued in Application Serial No. 14743678.6.

Indian Notice of Publication dated Jul. 22, 2016 issued in Application Serial No. 6469/DELNP/2015.

Indian Notice of Publication dated Oct. 6, 2016 issued in Application Serial No. 6468/DELNP/2015.

Indian Notice of Publication dated Oct. 6, 2016 issued in Application Serial No. 6474/DELNP/2015.

Japanese Notice of Publication dated Mar. 31, 2016 issued in Application Serial No. 2015-555248.

Japanese Office Action dated Sep. 6, 2016 issued in Application Serial No. 2015-555248.

Japanese Office Action dated Sep. 6, 2016 issued in Application Serial No. 2015-555246.

Japanese Office Action dated Aug. 23, 2016 issued in Application Serial No. 2015-555247.

(56) References Cited

OTHER PUBLICATIONS

Korean Office Action dated Jul. 15, 2016 issued in Application Serial No. 2015-7022744.
Korean Office Action dated Jun. 27, 2016 issued in Application Serial No. 2015-7022330.
Korean Office Action dated Jun. 27, 2016 issued in Application Serial No. 2015-7021715.
Singapore Written Opinion dated Sep. 29, 2015 issued in Application Serial No. 11201505651W.
Singapore Written Opinion dated Oct. 16, 2015 issued in Application Serial No. 11201505654Y.
Abe, Junichiro—*First Step to Private Cloud with KVM* dated Jun. 13, 2011; http://gihyo.jp/admin/serial/01/ibm_kym/0006.
Berger, S. *vTPM: Virtualizing the Trusted Platform Module*, IBM Research Report RC23879, Feb. 14, 2006.
Cuong, Le *Protecting xen Hypercalls: ntrusion detection/prevention in a Virtualization Environmnent*; Jul. 31, 2009.
TPM Main Part 3 Commands (Specification Version 1.2, Level 2 Revision 85), Feb. 13, 2005.

\* cited by examiner

SECURE VIRTUAL MACHINE MIGRATION

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

Many cloud computing providers utilize virtualization to allow multiple users to share the underlying hardware and/or software resources. Virtualization can allow computing servers, storage devices or other resources to be partitioned into multiple isolated instances (e.g., virtual machines) that are each owned by a particular user. These virtual machines are often hosted using a hypervisor running on a host computing device. In this context, it is sometimes desirable to migrate a virtual machine from one host computing device to a different host computing device.

BRIEF DESCRIPTION OF THE DRAWINGS

Various embodiments in accordance with the present disclosure will be described with reference to the drawings, in which.

DETAILED DESCRIPTION

Figure 1A:
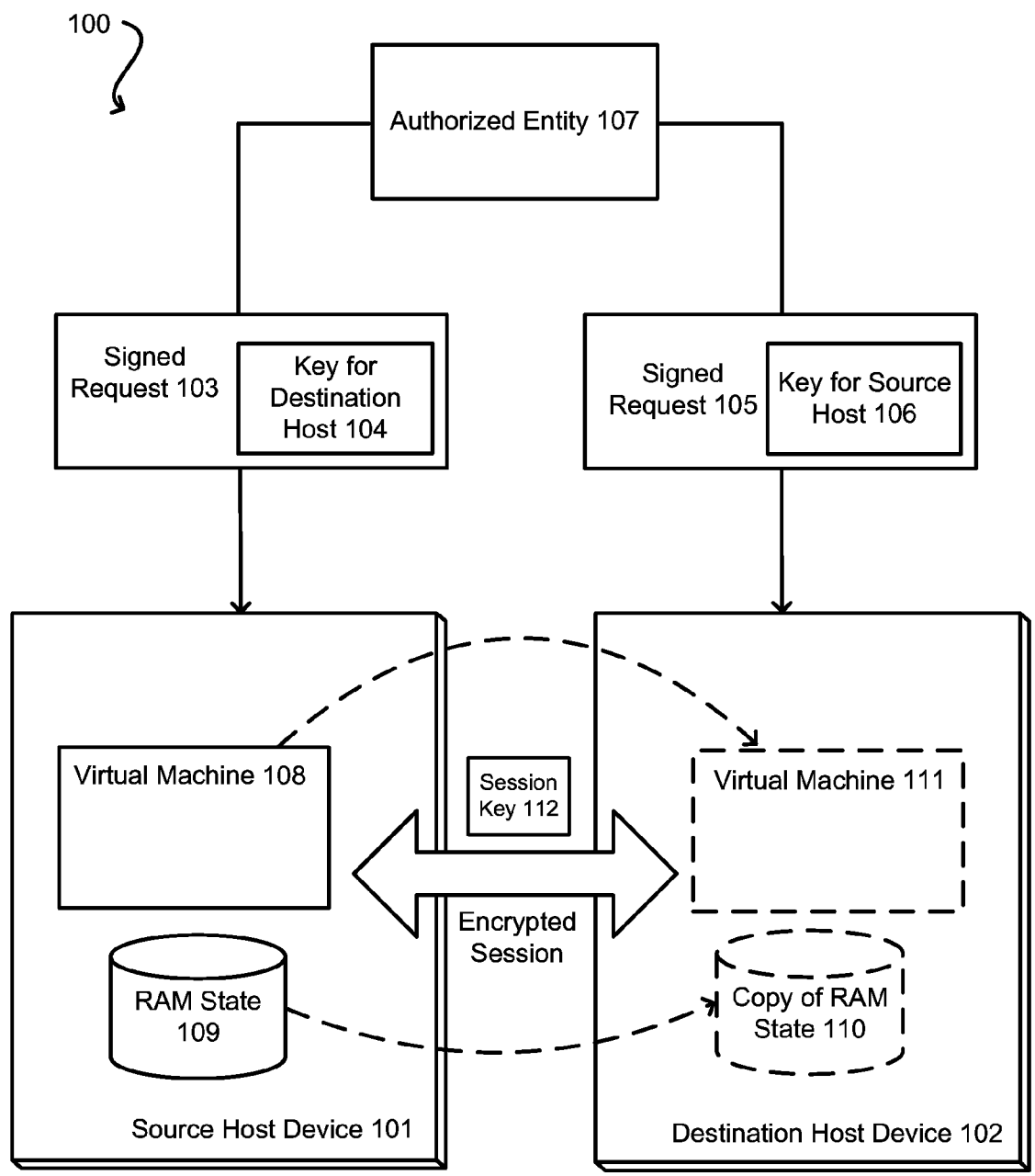
FIG. 1A illustrates an example of securely migrating a virtual machine between two host computing devices using multiple migration requests, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for migrating computing resources, such as virtual machines and other secured information (e.g., keystores, etc.). In particular, various embodiments utilize a security scheme, such as asymmetric (or symmetric) cryptography to enable secure (e.g., encrypted) migration of virtual machines between various host computing devices.

In various embodiments, the process for migrating a virtual machine (VM) or other secured information can begin with selecting a source host computing device and a destination host computing device. In one embodiment, a single request to migrate an instance can be addressed to two different host devices (source host and destination host). This request can include the keys for both host computing devices. In another embodiment, two requests can be issued; one request is issued to the source host, the other to the destination host. Each request includes (e.g., as a parameter) the public key for the other host. As such, the request to the source host computing device includes the public key of the destination host computing device, while the request to the destination host computing device includes the public key for the source host computing device.

Once the request is received by the source host computing device, the source host computing device contacts the destination host computing device and mutual authentication is performed. In accordance with an embodiment, the two host computing devices establish a secure session and agree on a migration key (e.g., a session key) that will be used for migration. The secure session is established using the keys that were provided to the source host computing device and destination host computing device as part of the request to migrate. Migration of the virtual machine includes a transfer of state information (e.g., disk state, RAM state, etc.) from the source host computing device to the destination host computing device. The state data can be transmitted over the secure session from the source host computing device to the destination host computing device and the state data can be encrypted using the migration key that was negotiated. The encryption of transmissions can prevent untrusted parties from reading, modifying or otherwise gaining access to the transmitted data.

In some embodiments, the initial request to start migration can itself be encrypted and/or signed, in order to prevent any intermediate parties from reading the parameters and other information of the request and in order to ensure the authenticity of the request. The request to migrate the VM can be submitted to the kernel or the virtualization layer (e.g., hypervisor) using a formalized set of interfaces (e.g., application programming interfaces (APIs)) that enables the request to be securely provided to the kernel and/or the virtualization layer on a host computing device.

In various embodiments, a security scheme as described herein can be utilized in a multi-tenant shared resource environment (e.g., cloud computing environment) when performing privileged operations in locations such as hypervisors and/or OS kernels of host computing devices. Conventionally, in this type of environment, host computing devices utilize virtualization technology to provision one or more virtual machine instances that are associated with different customers of a service provider (e.g., cloud computing provider). These virtual machine instances are hosted on the computing device using a hypervisor (or other virtualization technology) and each virtual machine instance can contain a guest operating system, including a kernel, device drivers and other OS components. The host computing devices and other physical resources to host the virtual machines are usually provided by the service provider and reside in resource centers, such as a data centers, server farms, content delivery network (CDNs) points-of-presence (POPs) and the like. In various embodiments, the security scheme described herein can enable the virtual machine instances to be securely migrated between multiple host computing devices, thereby allowing the service provider to improve resource utilization without compromising data security during the migration process. Because the migration request is signed, unauthorized parties cannot issue reads or writes as part of a fraudulent migration. Because the data transmission between the source and the destination is encrypted, untrusted parties cannot read the block data being transmitted.

In accordance with one embodiment, a service can be provided in the multi-tenant computing environment, where the service initiates the migration process. In this embodiment, the service can identify a virtual machine to be migrated, determine a destination host for the virtual machine, and issue an API call(s) to start the migration process. For example, the service can submit the migration request via the API call to the host computing device and destination host with the appropriate keys. The migration is then carried out by establishing a secure migration session using the keys, as previously described.

In some embodiments, rather than migrating the virtual machine, the security scheme described herein can be used to remotely read the memory of a virtual machine or to have the virtual machine copied to storage to be inspected later (e.g., by a forensic expert). For example, a service can submit an API call to the host computing device hosting the virtual machine, where the API call requests the memory of the virtual machine to be provided to the service. Alternatively, the service may request that the host computing device copy the virtual machine to a designated location in memory, to be analyzed later. The request may include one or more keys. In response to receiving the request, the host computing device hosting the VM can establish a secure session with the requesting computing device using the one or more keys and then either provide access to the memory of the virtual machine or write the memory of the virtual machine to a designated location.

FIG. 1A illustrates an example 100 of securely migrating a virtual machine between two host computing devices using multiple migration requests, in accordance with various embodiments. As illustrated, an authorized entity 107 can select a source host computing device 101 and a destination host computing device 102, and initiate migration of a virtual machine 108 from the source host computing device 101 to the destination host computing device 102. The authorized entity can be any party (e.g., user, application, service, etc.) that is allowed to make the migration request, such as a network administrator or other technician of the service provider having privileged access for performing migration.

In the illustrated embodiment, to start migration, the authorized entity 107 issues two requests (103, 105)—one request to each of the host computing devices involved. Each request includes the public key for the other. In particular, request 103 which is addressed to source host device 101 includes a public key 104 for the destination host computing device 102, while the request 105 includes a public key 106 for the source host computing device 101. In one embodiment, each request is signed in order to ensure authenticity of the request. The requests can be signed by using the private key of the authorized entity 107, as will be described with reference to FIG. 2. The signing of the migration requests can enable the host computing devices to verify that the requests were initiated by the appropriate authorized entity 107, rather than an imposter.

Once the requests are received by the respective computing devices, the source host computing device 101 contacts the destination host computing device 102 and mutual authentication is performed to establish a secure session. In various embodiments, the mutual authentication can be performed by using techniques similar to transport layer security (TLS) and secure socket layer (SSL). In particular, the mutual authentication can be performed by the source host computing device 101 and destination host computing device 102 negotiating a session key 112 for the secure session, using the private and public keys of the two hosts effectively as client and server certificates. In one embodiment, the source host computing device 101 contacts the destination host computing device 102, wherein the source host computing device and the destination host computing device authenticate each other by using the keys that were provided in the request. Once authenticated, the source host computing device and destination host computing device agree on a session key to be used to transmit the state information. In one embodiment, the key agreement is Diffie-Hellman in order to ensure forward secrecy. The bulk cryptography utilized for transmitting the state information can be Authenticated Encryption Security Galois/Counter Mode (AES-GCM). In alternative embodiments, the key can be negotiated using other techniques. Yet in other embodiments, the session key can also be included as part of the original migration requests (103, 105).

In accordance with an embodiment, the data transmitted from the source host computing device 101 to the destination host computing device 102 is encrypted to the session key 112 negotiated as part of establishing the secure session. Parties that do not have the key cannot decrypt this data, thereby ensuring secure data transfer between the two hosts. In various embodiments, the migration of the virtual machine (108, 111) to the destination host computing device 102 can include copying state information (109, 110) to the destination host computing device 102. In one embodiment, the read interface on the source host computing device 101 can connect to a write interface on the destination host computing device 102 and use the for virtual machine migration. Depending on the type of migration involved, the state information 109 that needs to be copied may include disk state, random access memory (RAM) state, network firewall state external to the VM, and the like. In some embodiments, some of the state information, such as network input/output (I/O) operations may need to be copied in order.

In an alternative embodiment, instead of keys, one or more certificates can be used to securely migrate the virtual machine. In this embodiment, the request 103 to the source host computing device 101 may include the certificate for destination host computing device 102 or it may include only the identifier for host computing device 102. Upon receiving the request, host computing device 101 can contact host computing device 102, where host computing device 102 expects a signed certificate and performs standard certificate validation. The general use of certificates and certificate authorities is described in more detail with reference to FIG. 3 and the associated text.

In one embodiment, the source host computing device 101 can perform live migration of the virtual machine to the destination host computing device 102. Live migration means that the virtual machine continues to run on the source host computing device 101 while the migration is completed, in contrast to cold migration or reboot migration, which involves first shutting down the virtual machine on one host computing device and then starting the virtual machine on another host computing device. It should be noted, however, that many of the embodiments described herein are not limited to live migration and any other type of migration can be implemented within the scope of this disclosure.

If live migration is performed, the source host computing device 101 can start copying data such as RAM state to the destination host computing device 102 from beginning to end while the virtual machine is running on the source host computing device 101. Because the RAM on the source host computing device 101 can be substantially large (e.g., gigabytes), the copying of the entire RAM state can take a significant amount of time. As a result, once the copying is completed, some fraction of the state is likely to be invalid because the state data was continuously being mutated by the running virtual machine while the RAM state was being transmitted to the destination host computing device 102. To resolve these invalid portions, once the entire RAM state is transferred, the source host computing device 101 can start at the beginning again, but this time copying only the changes to the RAM state. This process can then be repeated a number of times in order to minimize the amount of invalid state data between the source host computing device 101 and the destination host computing device 102. As the process is repeated, the amount of state data that needs to be copied to the destination host computing device 102 keeps getting smaller in size due to the reduced time taken to copy the changes. For example, to copy the entire RAM state, a gigabyte of data may need to be sent, to copy the first set of changes 100 megabytes may need to be sent, and to copy the next set of changes 10 megabytes may need to be sent, and so on. The process can be repeated until a predetermined threshold is reached, at which point the virtual machine can be stopped on the source host computing device 101, the changes copied to the destination host computing device 102, and a new instance of the virtual machine 111 is started on the destination host computing device 102. In various embodiments, throughout live migration, a significant amount of data that is being transmitted between the source host computing device 101 and the destination host computing device 102 can be encrypted using the session key that was negotiated between the source and the destination, as previously described. In this fashion, the sensitive data being sent between the two hosts is secured and unreadable by any other party outside of the source host computing device 101 and destination host computing device 102.

Figure 1B:
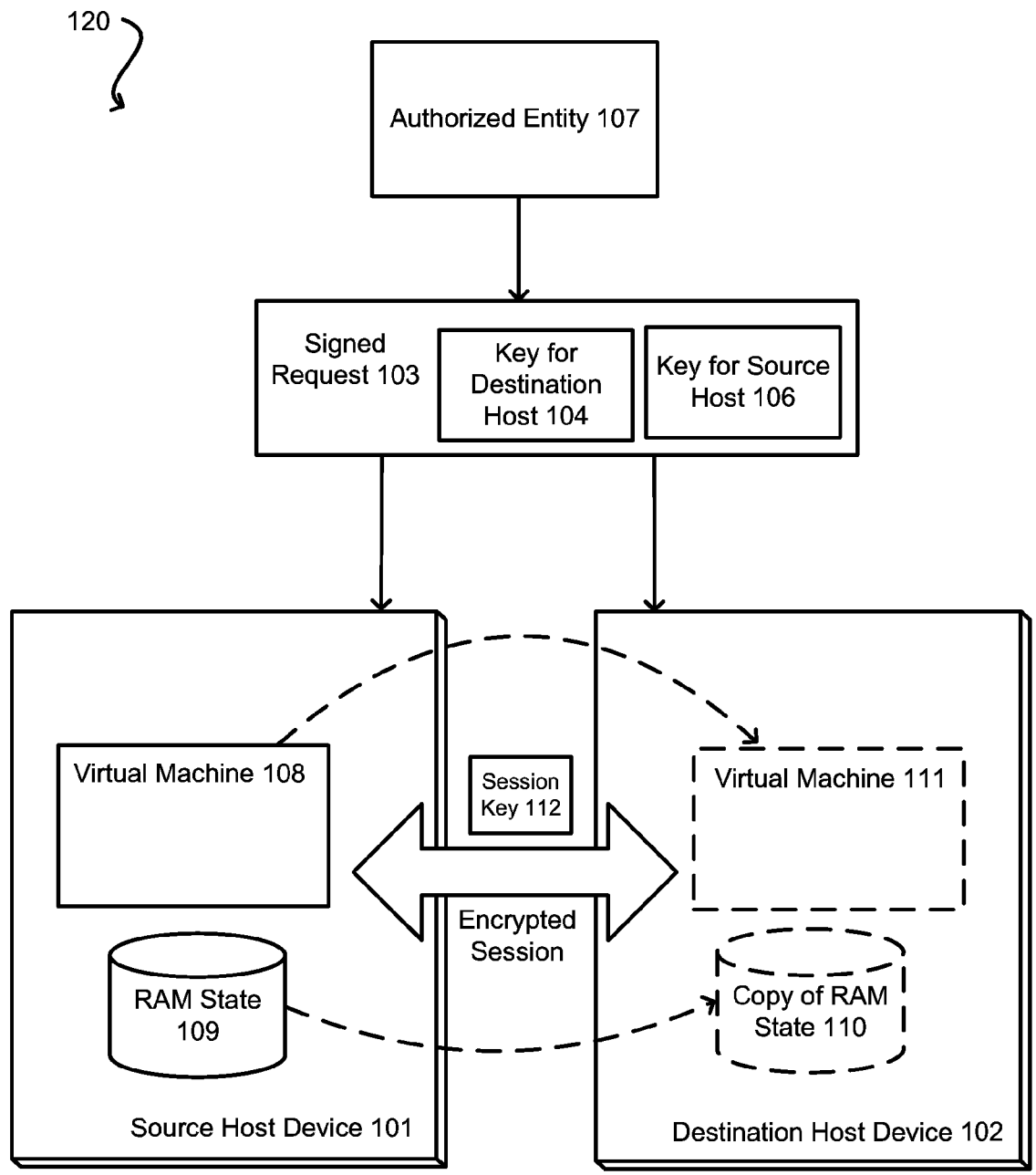
FIG. 1B illustrates an example of securely migrating a virtual machine between two host computing device using a single migration request, in accordance with various embodiments.

FIG. 1B illustrates an example 120 of securely migrating a virtual machine between two host computing devices using a single migration request, in accordance with various embodiments. As illustrated, the authorized entity 107 can initiate migration of the virtual machine instance from the source host computing device to the destination host computing device, in a similar manner as previously described with reference to FIG. 1A. In the embodiment of FIG. 1B, however, the authorized entity 107 can generate one request 103 that is addressed to two different hosts: the source host computing device 101 and the destination host computing device 102. The request 103 includes the keys for both devices. For example, the migration request 103 can request to migrate virtual machine 108 from host computing device 101 to host computing device 102 and the request may include (e.g., as a parameter) key 104 for host 101 and the key 106 for host 102. The request can be signed using the private key of the authorized entity.

In accordance with an embodiment, the request is provided to both the source host computing device 101 and the destination host computing device 102. Because the keys were included in the signed request 103, each host computing device trusts the keys just as they trust the signer of the request. Once the requests are received, the source host computing device 101 and destination computing device 102 establish a secure session and negotiate a session key 112 to migrate the virtual machine 108 and to copy the state information 109 to the destination host computing device 102, as previously described.

It should be noted that although the figures and associated text describe various techniques for migrating virtual machines, this is not a limitation to all of the embodiments described herein. In various alternative embodiments, any other secured information can be migrated or transferred from the source host computing device 101 to the destination host computing device 102 using the security scheme described herein. For example, a keystore containing a plurality of keys can be securely migrated from the source host computing device 101 to the destination host computing device 102. Similarly, the state of the trusted platform module (TPM) of the source host computing device 101 can be migrated to a destination host computing device. In the same manner, IP tables, rules and other information can be securely in accordance with various embodiments described herein.

Figure 2:
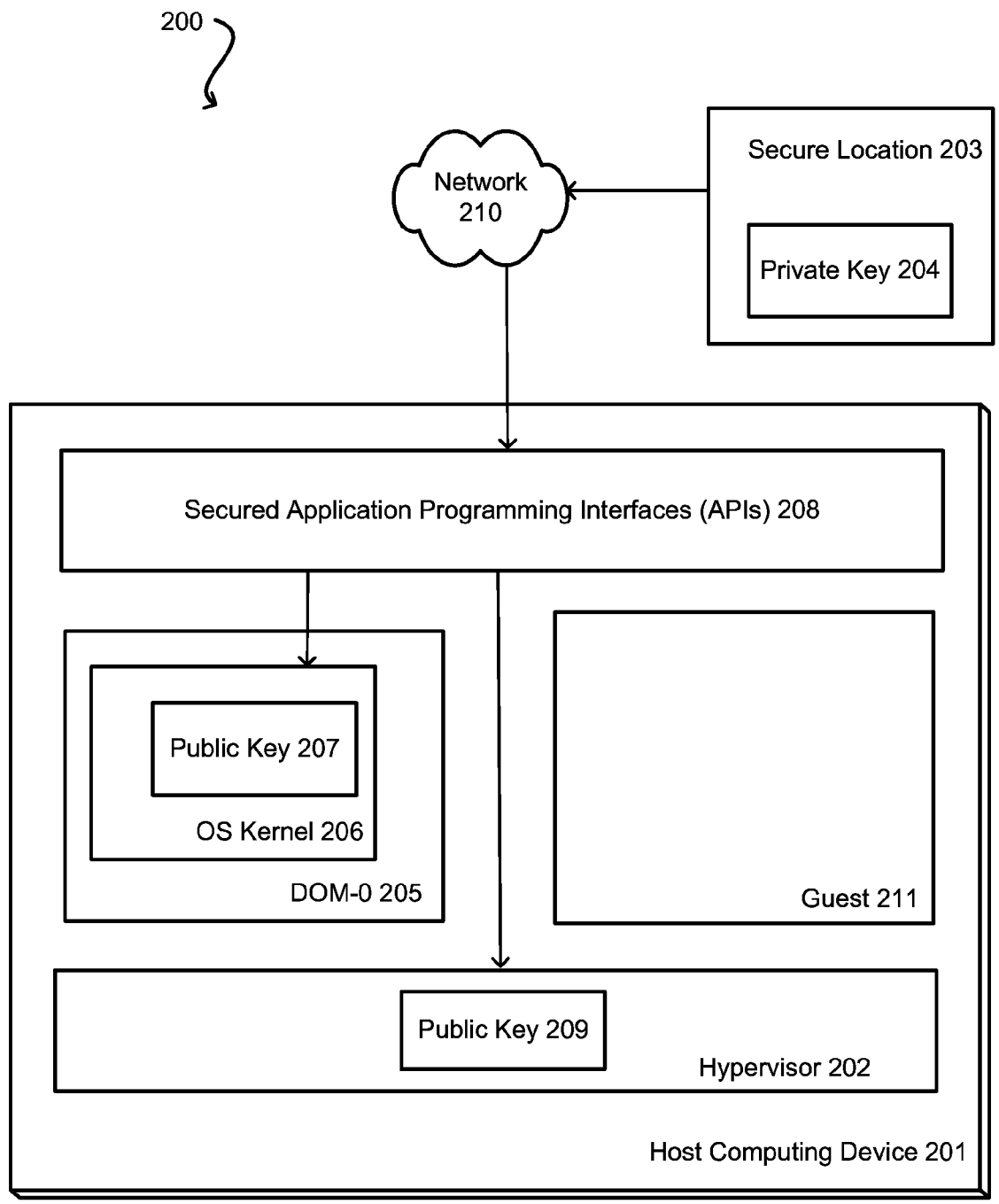
FIG. 2 illustrates an example of using asymmetric cryptography to sign the migration requests submitted to a host computing device, in accordance with various embodiments.

FIG. 2 illustrates an example 200 of using asymmetric cryptography to sign the migration requests submitted to a host computing device, in accordance with various embodiments. In the illustrated embodiment, a host computing device 201 includes at least one virtualization layer (illustrated as a combination of a hypervisor 202 and Dom0 205) and one or more guests 211. The guests can be virtual machine instances, each having their own respective operating system (OS), kernel 206, device drivers, scheduler and the like. Dom-0 205 is used to launch and manage the other guest domains on the host computing device 201. While the virtualization layer is illustrated as separate components in this figure, other implementations of a virtualization layer are possible and within the scope of the disclosure. For example, the functions of Dom0 205, or a subset of the functions, as well as those affected by the hypervisor 202 can be integrated into a single component. In various embodiments, the virtualization layer can include either type 1 hypervisor that runs directly on the hardware or type 2 hypervisor that runs within an operating system.

In accordance with an embodiment, the host computing device 201 provides a set of APIs 108 that can be used to submit signed and/or encrypted requests to perform privileged operations on the kernel 206 (e.g., Dom-0 kernel) or the hypervisor 202 of the host computing device 201. The privileged operation can alter the running memory image of the hypervisor and/or the kernel. For example, the privileged operation can apply a patch to the hypervisor/kernel, read a location in memory, modify one or more variables executing on the host computing device, start/stop a virtual machine instance executing on the host computing device, migrate the virtual machine to another host computing device, or the like. Because the API requests are encrypted, intermediary parties outside of the kernel/hypervisor cannot read the request and do not know what the request is intended to perform.

In accordance with an embodiment, the requests of the API can be signed and verified using an asymmetric key pair that includes a private key and a public key. In one embodiment, at least some (or all) of the arguments to the API call are canonicalized and serialized, resulting in a string-to-sign. This string can then be signed either via hash-based message authentication code (HMAC) or asymmetric cryptography, and sent to the API 208. Because the parameters to the API are included in the signature, a potential attacker who obtained the request (e.g., the code that made the request) would be unable to alter the request.

In accordance with some embodiments, the request can contain a timestamp, providing time window based replay protection, where the request remains valid for only a limited duration of time. In some embodiments, the request can include a unique value that is specifically associated with the host computing device 201, such as a serial number or host machine identifier (ID). While these values may not be secret, including them can bind the request to a particular host computing device 201. In that case, a potential attacker would be prevented from replaying the request against a different host computing device. In some embodiments, the request can be authenticated by the trusted platform module (TPM) (not illustrated) in the host computing device 201 in order to increase the strength of the binding to the host computing device 201.

In accordance with the illustrated embodiment, the private key 204 used to sign the API requests is not present on the host computing device 201 to which the requests are addressed. Instead, the private key 204 can be stored in a secure location 203 on the network 210 of the service provider, or in another trusted location. As a result, if malicious agents were present on the host computing device 201, they would not be able to forge requests using the private key 204.

The host computing device 201 can include a public key that can be used to verify the signature of the requests which have been signed using the private key 204. In one embodiment, the public key 207 can be compiled into the kernel 206 of the host computing device 201. In another embodiment, the public key 209 can be compiled into the hypervisor 202. In some embodiments, the kernel 206 may store a different public key 207 than the public key 209 stored on the hypervisor 202, while, in other embodiments, the same public key may be used to verify requests on both the hypervisor 202 and the kernel 206. In yet other embodiments, rather than storing the actual public key on the host computing device 201, the host computing device 201 may instead be configured to trust any public key that is certified by a particular certificate authority (CA). In those embodiments, the host computing device 201 may receive the request from the requestor, where the request is accompanied by a certificate that includes the public key. The host computing device would trust the certificate of the CA and therefore trust the public key received as part of the request. Regardless whether the public key is stored on the host computing device or provided along with a certificate, the public key can be used to verify an API request that was signed using the private key 204. For example, if a user (e.g., customer, technician of the service provider, third party, etc.) wanted to apply an update to some portion of code on the kernel 206, they can obtain access to or use of the private key 204 to sign the API request to modify the appropriate portions of code. Upon receiving the request, the kernel 206 can attempt to verify the request using the public key, and if verification is successful, execute the necessary privileged operations.

In alternative embodiments (not shown), if HMAC and symmetric keys were utilized, the key may be compiled into the kernel 206 or the hypervisor 202. In that case, the key could be obfuscated and changed with every build, but the key may actually be present on the host computing device 201. Optionally, the entire request could be encrypted to a key compiled into the kernel, such that the request itself is opaque to the code issuing it.

In some embodiments, one or more restrictions can be applied according to the particular key that has been provided with the request (or according to the party in possession of the key). For example, requests signed by some actors may only be allowed to start/stop guest virtual machines on the host computing device 201 or reboot the host computing device 201. Requests signed using a key held by other actors (e.g., OS team of the service provider) may be allowed to modify the running code of the hypervisor. In one embodiment, the host computing device 201 can have multiple different public keys stored thereon, where each public key is associated with a private key associated with a different entity (e.g., user, team, etc.) Depending on which entity's private key was used to sign the request, the requested operation may be allowed or denied. In an alternative embodiment, the host computing device 201 may store only one public key that is associated with one private key, however, the request can include the identity of the user submitting the request. Based on this identity, the host computing device 201 may apply different restrictions on the execution of the requested operation. For example, the host computing device 201 may allow one user to stop/start a guest, while another user may be allowed to modify or update code of the hypervisor. Any number of such restrictions (e.g., on a per-key or per-party basis) are possible and within the scope of the embodiments described herein.

Figure 3:
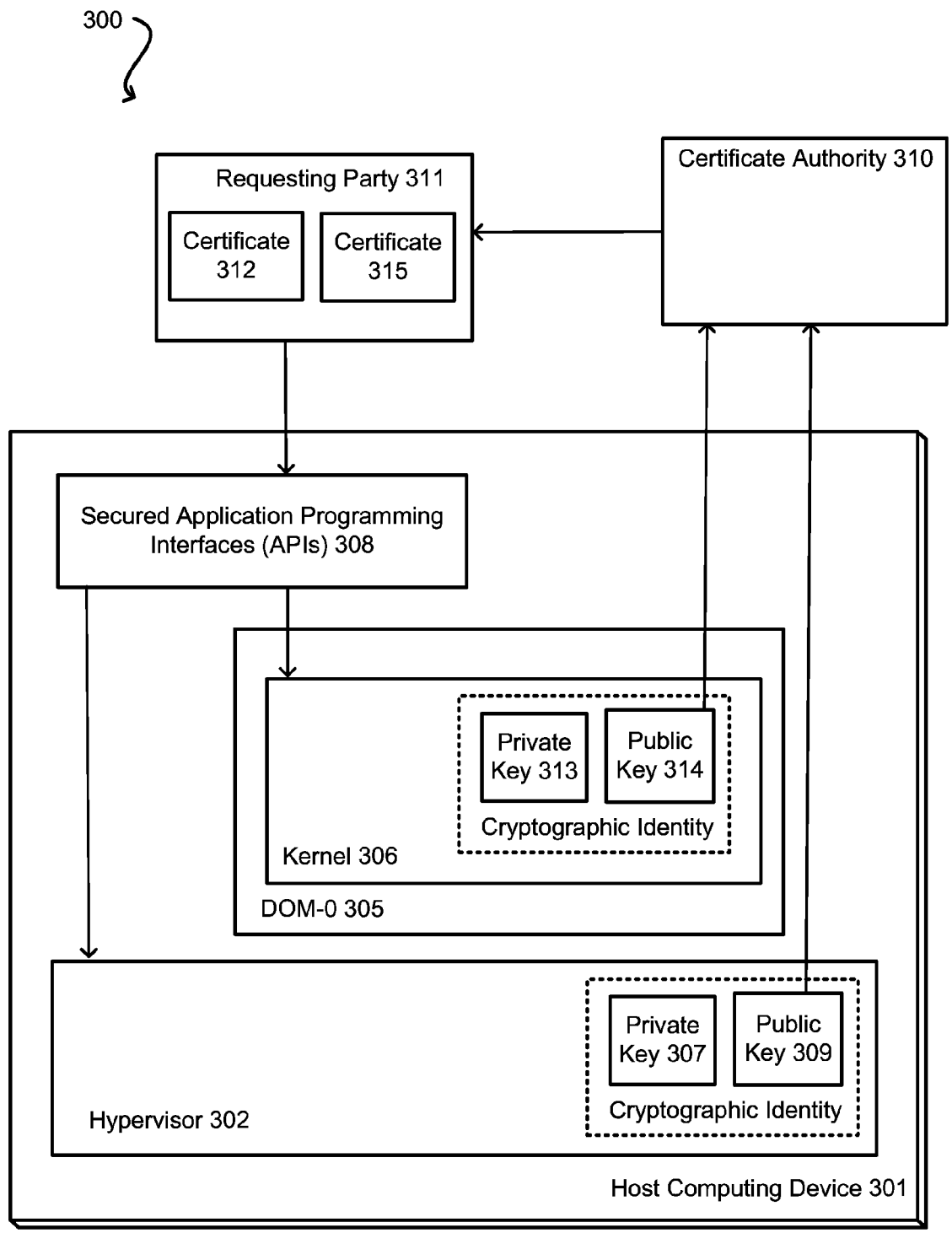
FIG. 3 illustrates an example of utilizing a certificate authority in accordance with various embodiments.

FIG. 3 illustrates an example 300 of utilizing a certificate authority in accordance with various embodiments. In the illustrated embodiment, the host computing device (e.g., the kernel 306 and/or the hypervisor 302 on the host computing device 301) generates a cryptographic identity comprised of an asymmetric key pair at boot time. For example, when the host computing device 301 is booting the hypervisor 302 generates a key pair that includes a private key 307 and a public key 309. Similarly, when the Dom0 305 is loaded, the kernel 306 generates a key pair comprised of private key 313 and public key 314.

In various embodiments, the public keys (309, 313) can be published in some fashion. For example, the public keys can be provided to a certificate authority 310. Alternatively, the public key can be provided directly to the requesting party. This public key could be collected, and the request could be encrypted using this key. In this embodiment, the private keys (307, 314) that were generated by the host device 301 never leave the host and do not exist anywhere else. If a requesting party can reliably get the public key from the host computing device 301, then it can guarantee that the request signed using the public key will be going to that host computing device 301 (and only that host computing device) because the request is signed by using a public key (309, 314) that can only be decrypted by the private key (307, 313) that never left the host computing device 301. It should be noted that although FIG. 3 illustrates an example where both the kernel 306 and the hypervisor 302 issue their own respective key pairs, this is not a requirement or a limitation for all embodiments. In some embodiments, only the hypervisor 302 issues a key pair. In other embodiments, only the kernel 306 issues key pairs. Yet in other embodiments, the hypervisor 302 and the kernel 306 can share a key pair.

In some embodiments, the host computing device 301 can provide the public key 309 to a certificate authority (CA) 310. The CA 310 can be an entity that issues one or more digital certificates (312, 315) to appropriate requesting parties (e.g. signing party 311). The digital certificates certify that the party appropriately owns the public key that can be used to sign the API request. In this embodiment, the use of the CA enables the requesting party to believe, with a degree of certainty, that the private key is indeed for the host computing device 301. In one embodiment, the CA is a CA for the service provider and runs within the resource center of the service provider. The resource center is described in further detail with reference to FIG. 4 below. In an alternative embodiment, the CA 310 is a trusted third party that is trusted by both the signing party 311 and the host computing device 301 relying upon the certificate. Certificate authorities are well known in the art and are used in many public key infrastructure (PKI) schemes.

In this embodiment, once the CA 310 issues a certificate 312 to a requesting party 311, the requesting party 311 can use the certificate to make API requests to execute privileged operations in the context of the kernel 306 or hypervisor 302. The hypervisor 302 or kernel 306 can then verify that any certificate signed by a particular CA issued to a particular party is valid and can execute the privileged operation accordingly.

It various embodiments, the techniques illustrated in FIG. 3 can be used in conjunction with the techniques illustrated in FIG. 2. For example, the requesting party 311 of FIG. 3 can have its own private key, which the requesting party can use to sign the request to execute a privileged operation. In this embodiment, the request is both signed to ensure authenticity (i.e. the host computing device would know with certainty that the requesting party generated the request), as well as encrypted to ensure privacy (i.e. no external parties could decipher the information contained in the request).

Figure 4:
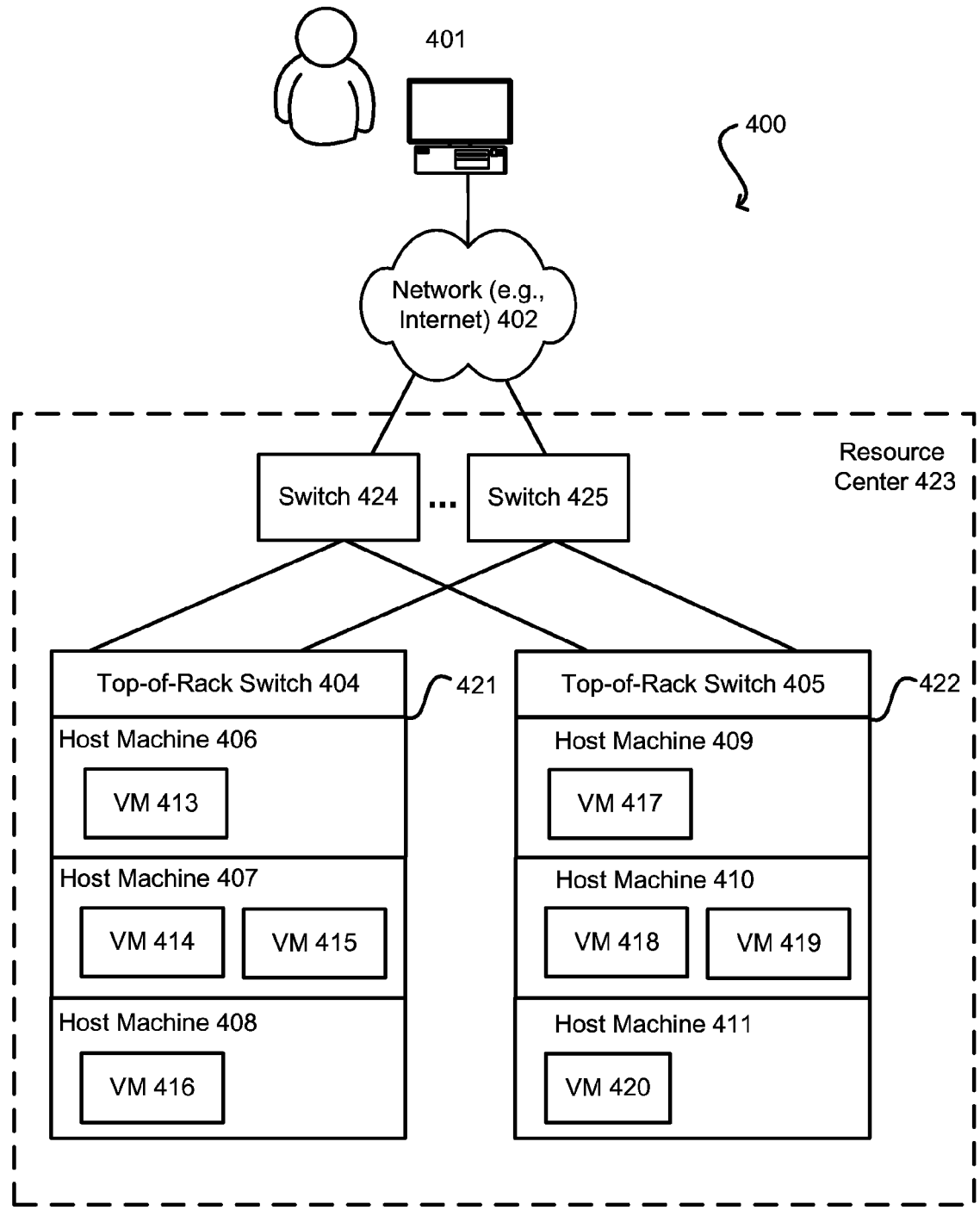
FIG. 4 illustrates an example of a resource center environment of the service provider, in accordance with various embodiments.

FIG. 4 illustrates an example 400 of a resource center environment of the service provider, in accordance with various embodiments. In the illustrated embodiment, a service provider (e.g., a cloud computing resource provider) can maintain one or more resource centers 423 (e.g., data centers, server farms, etc.) that store the physical resources (e.g., host servers, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider.

In accordance with an embodiment, once the virtual machine instance is up and running, there may be situations where it is desirable to move the virtual machine instance from the host computing device to another host computing device. For example, the service provider may determine that the host computing device on which the virtual machine is being hosted is being overloaded with requests, due to other virtual machine instances being hosted on the same host computing device. In various embodiments described herein, the security scheme described throughout this disclosure enable the service provider to use asymmetric (or symmetric) cryptography to migrate the data (and the VM) from the host computing device to another host computing device in an encrypted and secured fashion.

Figure 5:
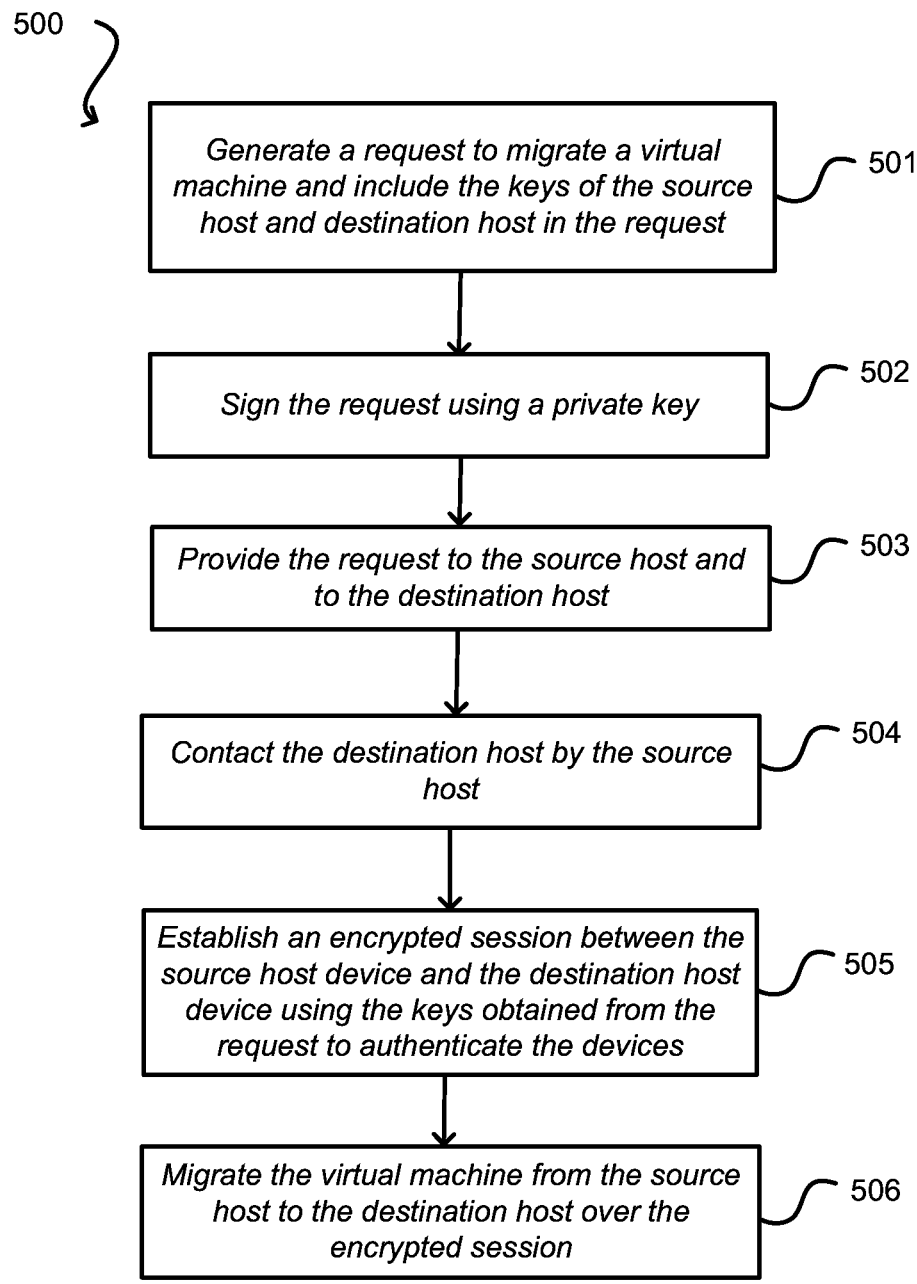
FIG. 5 illustrates an example process for securely migrating a virtual machine instance between multiple host computing devices, in accordance with various embodiments.

FIG. 5 illustrates an example process 500 for securely migrating a virtual machine instance between multiple host computing devices, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, an authorized party generates a request to migrate a virtual machine from one host computing device to another host computing device. The request can be generated using an application programming interface (API) as previously described. In one embodiment, the request can include the key for the source host computing device and another key for the destination host computing device. In an alternative embodiment, the authorized party may generate two requests: one migration request for the source hot computing device which includes a key for the destination host computing device, and a separate migration request for the destination host computing device which includes a key for the source host computing device.

In operation 502, the request is signed using the private key of the authorized party, as previously described. The signing of the request ensures authenticity of the request. That is, any recipient of the request is ensured that the authorized party was the party who actually generated the request.

In operation 503, the request(s) is provided to the source host computing device and to the destination host computing device. The request can be submitted to the host devices using an API or by some other techniques known in the art. In operation 504, once the devices receive the request, the source host computing device contacts the destination host computing device. In operation 505, the source host computing device and the destination host computing device establish a secure session by using the keys provided as part of the request to authenticate the source and the destination machines. In one embodiment, establishing the secure session can include negotiating a session key that will be used to encrypt data that will be transmitted between the source host computing device and the destination host computing device.

In operation 506, the virtual machine instance is migrated from the source host computing device to the destination host computing device using the secure session. In one embodiment, migrating the virtual machine includes copying state information from the source host computing device to the destination host computing device. The state information that is transmitted between the two devices can be encrypted using the session key negotiated as part of establishing the secure session. In this manner, any party that may intercept or tap the transmissions cannot decipher the potentially sensitive information contained therein.

Figure 6:
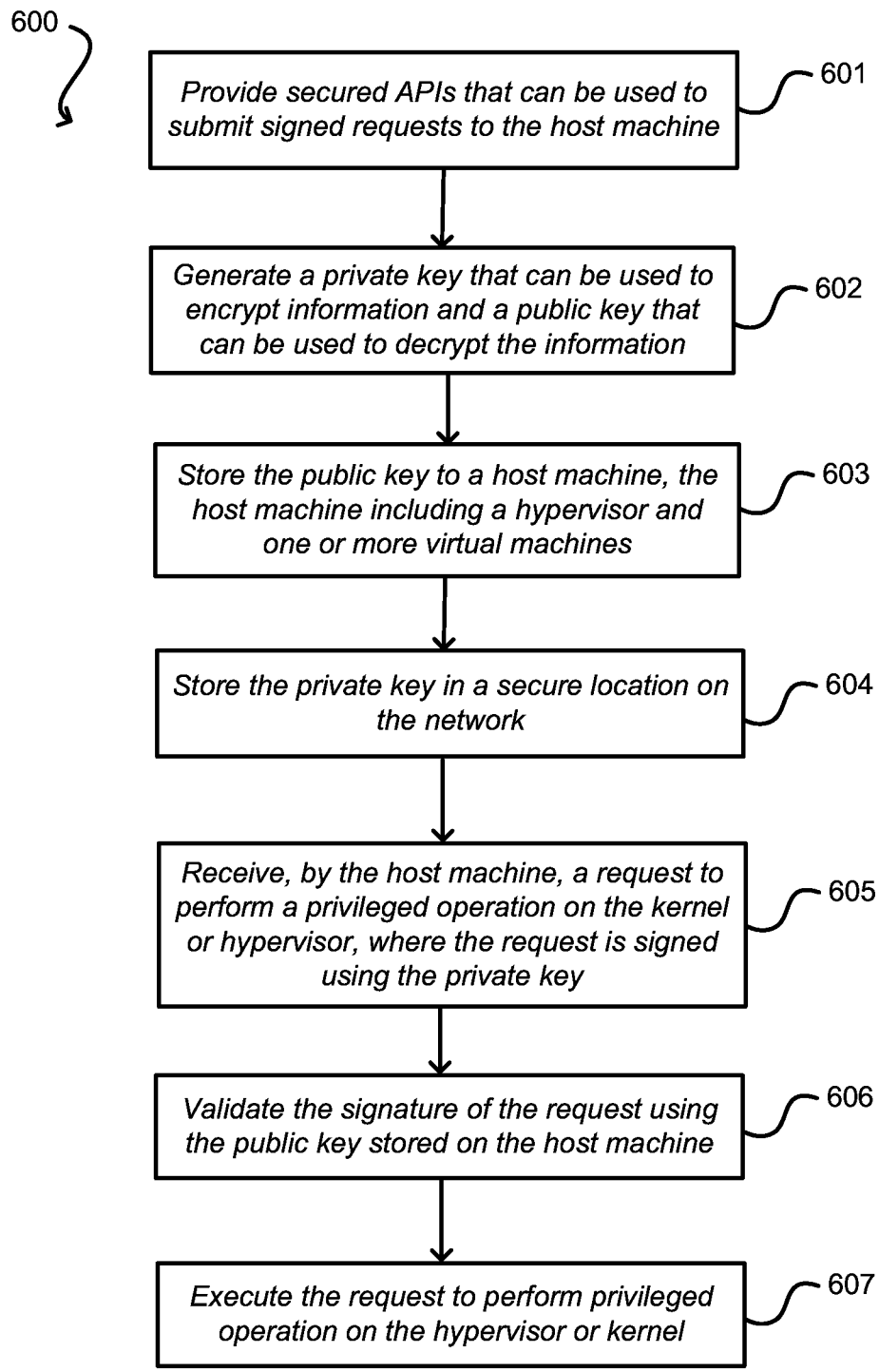
FIG. 6 illustrates an example process for providing APIs that can be used to perform privileged operations, such as migration requests, in a hypervisor or kernel, in accordance with various embodiments.

FIG. 6 illustrates an example process 600 for providing APIs that can be used to perform privileged operations in a hypervisor or kernel, in accordance with various embodiments.

In operation 601, one or more application programming interfaces (APIs) are provided, which can be used to submit signed and/or encrypted requests to a host computing device. The host computing device can include a virtualization layer (e.g., a Virtual machine monitor or a Dom0 operating in conjunction with a hypervisor) and one or more virtual machines having operating system kernels.

In operation 602, an asymmetric key pair is generated, including a private key and a corresponding public key. The private key can be used to encrypt information and the public key can be used to decrypt the information encrypted using the private key.

In operation, 603, the public key is stored on the host computing device. For example, the public key can be compiled into the kernel of the operating system or into the hypervisor. Alternatively, the key can be stored in the trusted platform module (TPM) of the host computing device.

In operation 604, the private key is stored in a secure location that is external with respect to the host computing device. In this embodiment, the private key is not present on the host computing device, such that any malicious agent residing thereon would not have access to the private key.

In operation 605, the host machine receives a request over the API, requesting to execute a privileged operation on the hypervisor and/or the operating system kernel (e.g., perform a migration request). In accordance with an embodiment, the received request is signed using the private key.

In operation 606, the host computing device (e.g., kernel or hypervisor) attempts to validate the signature of the request using the public key stored on the host computing device. If the signature of the request is validated, the privileged operation can be executed on the hypervisor/kernel, as shown in operation 607. If the signature cannot be validated using the public key, the privileged operation fails (i.e. is not executed).

Figure 7:
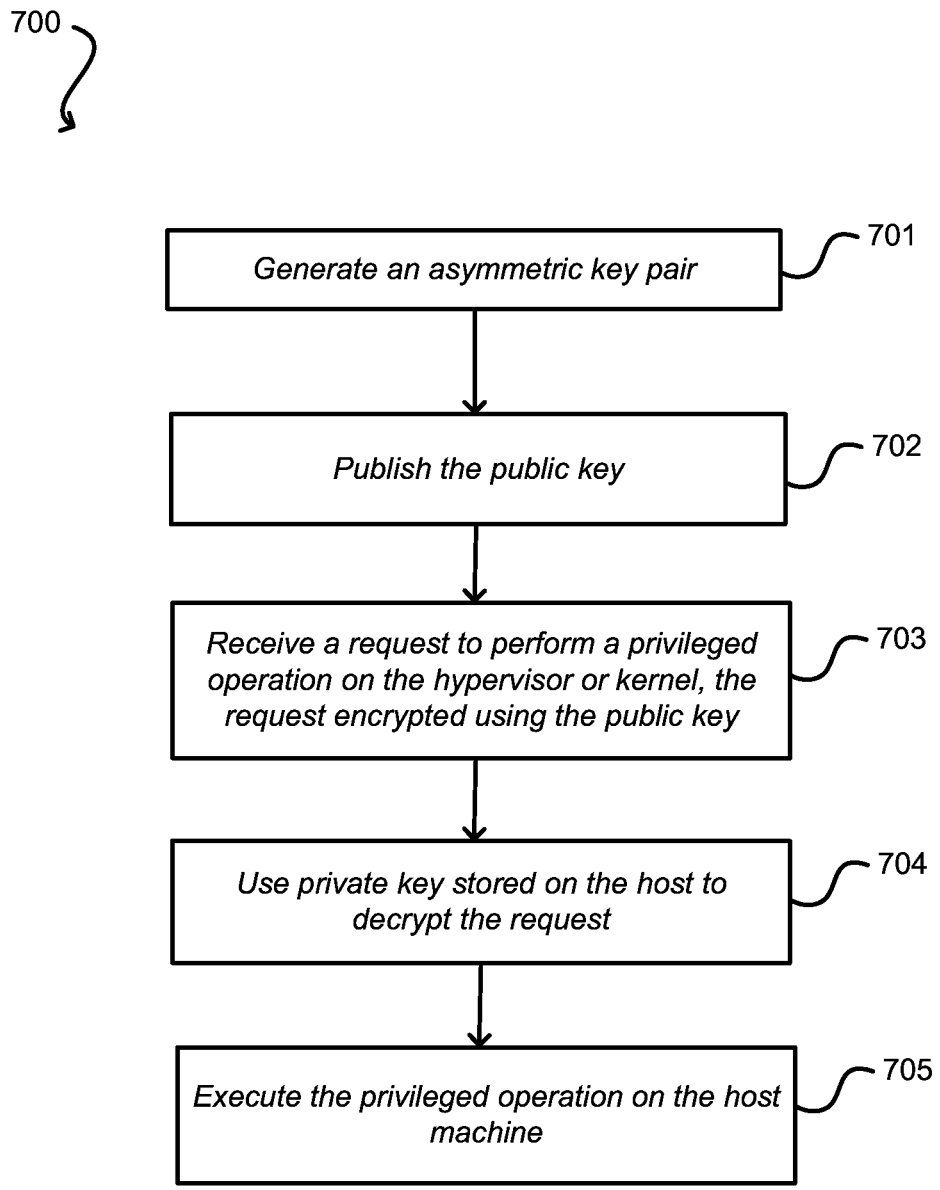
FIG. 7 illustrates an example process of utilizing encryption of requests, in accordance with various embodiments.

FIG. 7 illustrates an example process 700 of utilizing encryption of requests, in accordance with various embodiments. In operation 701, the host computing device generates an asymmetric key pair. For example, a boot process on the host computing device may generate a public key and a corresponding private key. In operation 702, the public key is published to a trusted source. In one embodiment, the public key can be provided directly to the requesting party that will use the public key to encrypt requests. In another embodiment, the public key can be provided to a certificate authority, where the certificate authority may grant certificates to authenticated parties that may wish to perform privileged operations on the kernel or hypervisor. In this embodiment, the certificate authority can embed the public key in the certificate and sign the certificate using its own private key. Thus, parties that receive the certificate can verify that the public key is indeed certified by the CA to be from the host computing device.

In operation 703, the host computing device receives a request to perform a privileged operation. The host computing device then attempts to decrypt the request using the private key stored on the host computing device, as shown in operation 704. If the request can be decrypted by using the private key, the host computing device can execute the privileged operation on the kernel/hypervisor, as shown in operation 705.

Figure 8:
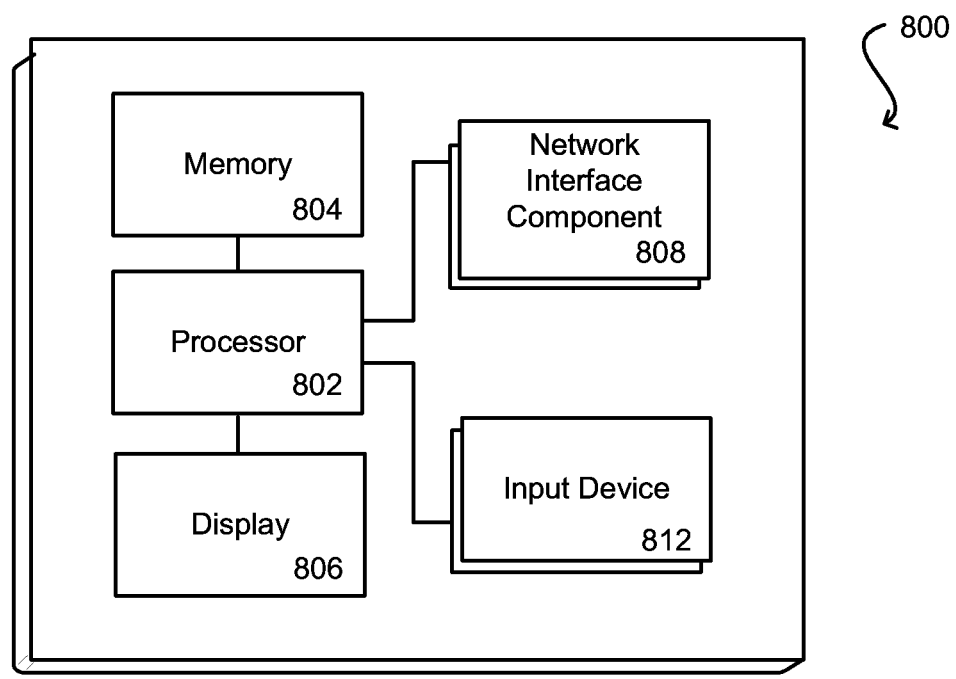
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
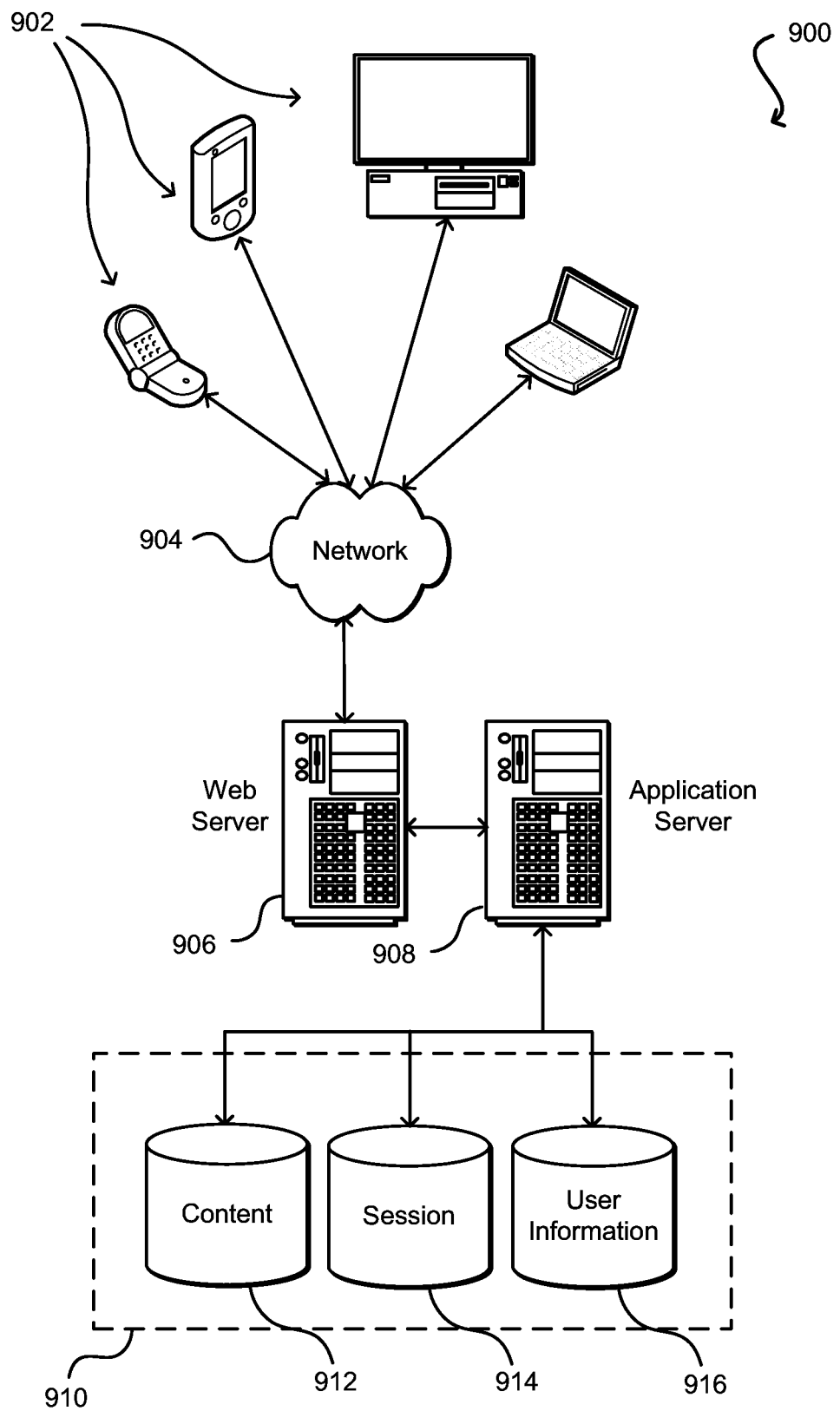
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for securing computing operations, said method comprising:
   receiving at least one request to migrate a virtual machine from a source host computing device to a destination host computing device from an authorized party, the source host computing device and the destination host computing device each including a virtualization layer, wherein the at least one request is signed by the authorized party having permission to migrate the virtual machine, the at least one request including a first key for the destination host computing device;
   verifying that the request was signed by the authorized party;
   performing mutual authentication between the source host computing device and the destination host computing device using at least the first key and a second key for the source host computing device, wherein the authorized party provided the second key to the destination host computing device to authenticate the source host computing device to the destination host computing device;
   establishing a migration key between the source host computing device and the destination host computing device, the migration key being established within the virtualization layer of the source host computing device by using at least the first key and the second key; and
   migrating the virtual machine from the source host computing device to the destination host computing device by:
      encrypting state information associated with the virtual machine using the migration key before the state information is communicated out of the virtualization layer of the source host computing device; and
      transmitting the encrypted state information to the destination host computing device, the encrypted state information being decryptable by the destination host computing device.

2. The computer implemented method of claim 1, wherein receiving the at least one request to migrate the virtual machine further comprises:
   receiving a first request by the source host computing device; and
   wherein the destination host computing device is configured to receive the second key in a second request.

3. The computer implemented method of claim 1, wherein migrating the virtual machine further comprises:

contacting the destination host computing device by the source host computing device; and performing mutual authentication by the source host computing device and the destination host computing device using at least the first key and the second key.

4. The computer-implemented method of claim 1, wherein the authorized party is remote from the source host computing device and the destination host computing device.

5. A computer implemented method, comprising:

receiving, by a source host computing device and from an authorized party, a request to migrate secured information from the source host computing device to a destination host computing device, the request including a destination key for the destination host computing device;

performing mutual authentication between the source host computing device and the destination host computing device by:

authenticating using the destination key, by the source host computing device, the destination host computing device; and receiving, by the source host computing device, an indication that the destination host computing device authenticated the source host computing device using a source key associated with the source host computing device, wherein the authorized party provided the source key to the destination host computing device;

establishing, by the source host computing device and the destination host computing device, a migration key using the destination key and the source key; and causing the secured information to be migrated from the source host computing device to the destination host computing device using the migration key.

6. The computer implemented method of claim 5, wherein the secured information is a virtual machine executing on the source host computing device.

7. The computer implemented method of claim 6, wherein causing the secured information to be migrated further comprises:

copying at least a portion of random access memory (RAM) state information from the source host computing device to the destination host computing device using the migration key;

stopping the virtual machine on the source host computing device; and sending an indication to the destination host computing device to run the virtual machine on the destination host computing device.

8. The computer implemented method of claim 5, wherein the source key is a public key that is part of a key pair generated at boot time of the source host computing device, wherein the source host computing device sends the public key to an administration server, wherein the administration server is operable to initiate the request to migrate the secured information using the public key.

9. The computer implemented method of claim 5, wherein establishing the key is performed according to a Diffie-Hellman key exchange process.

10. The computer implemented method of claim 5, wherein causing the secured information to be migrated further comprises:

copying a set of random access memory (RAM) state information from the source host computing device to the destination host computing device, wherein the copying takes a duration of time to complete; and transmitting a set of changes in the RAM state information from the source host computing device to the destination host computing device, wherein the changes were made on the source host computing device during the duration of time taken to complete the copying.

11. The computer implemented method of claim 5, wherein the request to migrate the secured information is signed to prevent unauthorized parties from submitting the at least one request.

12. The computer implemented method of claim 5, wherein the request further includes a certificate for at least one of: the source host computing device or the destination host computing device.

13. A computer implemented method, comprising:

selecting a virtual machine executing on a source host computing device, the virtual machine to be migrated to a destination host computing device;

submitting, using an application programming interface (API), at least one request to migrate the virtual machine from the source host computing device to the destination host computing device, the at least one request including at least one key of a first key associated with the source host computing device, the first key provided to the destination host computing device, and a second key associated with the destination host computing device, the second key provided to the source host computing device, the at least one request being submitted from an authorized party;

establishing, between the source host computing device and the destination host computing device, a secure session using the at least one key included with the at least one request to perform mutual authentication between the source host computing device and the destination host computing device by:

contacting the destination host computing device by the source host computing device;

authenticating the destination host computing device using the second key; and receiving an indication that the destination host computing device authenticated the source host computing device using the first key; and migrating the virtual machine from the source host computing device to the destination host computing device using the secure session in response to the at least one request.

14. The computer implemented method of claim 13, wherein submitting the at least one request further comprises:

submitting a first request to the source computing device, the first request including the second key; and submitting a second request to the destination host computing device, the second request including the first key.

15. A computing system, comprising:

at least one processor; and memory including instructions that, when executed by the at least one processor, cause the computing system to:

receive at least one request to migrate a virtual machine from a source host computing device to a destination host computing device from an authorized party, the at least one request including a first key and a second key;

perform mutual authentication between the source host computing device and the destination host computing device by:

authenticating, by the source host computing device, the destination host computing device using the first key; and receiving an indication that the destination host computing device authenticated the source host computing device using the second key;

establish a secure session between the source host computing device and the destination host computing device, the secure session established by using at least the first key and the second key; and migrate the virtual machine from the source host computing device to the destination host computing device using the secure session in response to the at least one request.

16. The computing system of claim 15, wherein migrating the virtual machine further comprises:

copying at least a portion of random access memory (RAM) state information from the source host computing device to the destination host computing device using the secure session;

stopping the virtual machine on the source host computing device; and starting a new instance of the virtual machine on the destination host computing device.

17. The computing system of claim 15, wherein receiving the request to migrate the virtual machine further comprises:

receiving a first request by the source host computing device, the first request including the second key; and receiving a second request by the destination host computing device, the second request including the first key.

18. The computing system of claim 15, wherein establishing the secure session further comprises:

negotiating a session key to be used for transmitting state information between the source host computing device and the destination host computing device during the secure session; and encrypting information transmitted between the source host computing device and the destination host computing device by using the session key.

19. The computing system of claim 18, wherein negotiating the session key is performed according to Diffie-Hellman key exchange process.

20. The computing system of claim 15, wherein migrating the virtual machine further comprises:

copying a set of random access memory (RAM) state information from the source host computing device to the destination host computing device, wherein the copying takes a duration of time to complete; and transmitting a set of changes in the RAM state information from the source host computing device to the destination host computing device, wherein the changes were made on the source device by the virtual machine during the duration of time taken to complete the copying.

* * * * *